United States Patent

Tsubota et al.

[11] Patent Number: 5,586,831
[45] Date of Patent: Dec. 24, 1996

[54] CONNECTOR FOR CONNECTING TWO PLATE-LIKE MEMBERS

[75] Inventors: Kazuaki Tsubota, Hiroshima; Takeshi Yamamoto, Hiroshima-ken, both of Japan

[73] Assignees: Delta Tooling Co., Ltd.; Delta Kogyo Co., Ltd., both of Hiroshima-ken, Japan

[21] Appl. No.: 491,578

[22] Filed: Jun. 16, 1995

[30] Foreign Application Priority Data

Oct. 25, 1994 [JP] Japan .................................. 6-260104

[51] Int. Cl.$^6$ ............................. F16B 5/06; B65H 19/18; B65H 69/06
[52] U.S. Cl. ......................... 403/305; 403/300; 403/314; 242/556; 226/92
[58] Field of Search ..................................... 403/300, 305, 403/306, 314, 362; 24/523, 486; 242/556, 564.3; 226/92

[56] References Cited

U.S. PATENT DOCUMENTS 1,208,481  12/1916  Cathcart .................................. 403/306
1,291,460  1/1919  Finley ..................................... 403/306
4,802,422  2/1989  Beard ..................................... 403/306

FOREIGN PATENT DOCUMENTS 265662  3/1970  U.S.S.R. ................................. 24/523
6765  3/1914  United Kingdom ..................... 24/523

Primary Examiner—Anthony Knight
Attorney, Agent, or Firm—Wenderoth, Lind & Ponack

[57] ABSTRACT

Two plate-like members are connected to each other by a connector for subsequent simultaneous feed thereof to, for example, a press. The connector includes a main body having two rectangular grooves, which have respective upper and lower walls and are open on opposite sides of the main body for receiving ends of the two respective plate-like members. A plurality of vertically movable pressure members and a plurality of locking screws are mounted on the main body to retain the ends of the two plate-like members within associated rectangular grooves.

19 Claims, 5 Drawing Sheets 5,586,831

CONNECTOR FOR CONNECTING TWO PLATE-LIKE MEMBERS

BACKGROUND OF THE INVENTION

1. Field of the Invention

The present invention relates generally to a connector for connecting two plate-like members and, more particularly, to the connector for connecting a trailing end of a plate-like member to a leading end of the next plate-like member so that these plate-like members can be fed substantially continuously to, for example, a press.

2. Description of Related Art

Conventionally, in automatically feeding plate-like members to be processed to a press or the like, a feeder having, for example, feed rollers is generally used.

By way of example, if such members are relatively thin steel plates, they are generally coiled, prior to processing, for ease of handling and shipment. During processing, each of the rolls of steel is carried by a carrier and is uncoiled by the feeder for subsequent feed thereof to the press.

When a substantial length of the steel plate has been processed by the press and the remaining length-has passed the feeder, the driving force of the feeder is not transmitted to the steel plate and, hence, the remaining length can no longer be fed by the feeder.

In this case, the remaining steel plate is removed from the processing line, or is manually fed to the press in synchronism with the operation thereof after the press has been switched to the manual mode. However, the manual feed of the steel plate not only prolongs the feed time, but also results in inaccurate feeding.

To overcome this problem, it can be conceived to connect the trailing end of the preceding steel plate with the leading end of the next uncoiled steel plate by means of, for example, tack welding so that the driving force of the feeder may be transmitted to the preceding steel plate via the next steel plate. Thus, the preceding steel plate can be automatically fed to the feeder until the trailing end of the preceding steel plate reaches a location immediately before press dies.

In practice, however, satisfactory tack welding cannot be achieved because the ends of the steel plates are not always flat and right-angled to respective sides thereof. It is, therefore, very difficult to positively join the ends of two neighboring steel plates for subsequent automatic and smooth feed thereof.

SUMMARY OF THE INVENTION

The present invention has been developed to overcome the above-described disadvantages and is intended to provide a connector capable of readily and positively connecting ends of two neighboring plate-like members together for subsequent simultaneous feed thereof.

Another objective of the present invention is to provide the connector of the above-described type which has a simple construction and can be readily manufactured at a low cost.

In accomplishing the above and other objectives, the connector of the present invention comprises a main body having two rectangular grooves defined therein, which have respective upper and lower walls and are open on opposite sides of the main body for receiving ends of two plate-like members therein, respectively. Retaining means is mounted on the main body to retain the end of at least one of the two plate-like members within associated one of the rectangular grooves for subsequent simultaneous feed of the two plate-like members.

When the ends of the two plate-like members are inserted into associated rectangular grooves, at least one of them is retained in the rectangular groove by the retaining means, thus ensuring subsequent simultaneous feed of the two plate-like members.

The retaining means may press the end of the plate-like member downwardly to prevent an accidental separation of the latter from the rectangular groove.

Advantageously, the retaining means comprises at least one threaded member threaded into the upper wall of one of the rectangular grooves so as to extend therethrough. Tightening of the threaded member positively retains the end of the plate-like member in the rectangular groove.

Alternatively, the retaining means comprises a plurality of pressure members pressed downwardly by associated biasing means. Mere insertion of the plate-like member into the rectangular groove causes the pressure members to retain the former in the latter without requiring any handling of the pressure members.

Conveniently, the pressure members have respective lead-in portions that facilitate insertion of the end of the plate-like member between lower ends of the pressure members and the lower wall of the rectangular groove.

The biasing force of the biasing means is so chosen as to allow the end of the plate-like member to be manually inserted between the lower ends of the pressure members and the lower wall of the rectangular groove.

In another form of the present invention, the connector comprises first retaining means and/or second retaining means, each mounted on the main body, for retaining the ends of the two plate-like members within associated rectangular grooves for subsequent simultaneous feed of the two plate-like members.

The first retaining means comprises a plurality of pressure members vertically movably disposed in the main body and a plurality of compression springs for biasing associated pressure members downwardly, while the second retaining means comprises a plurality of locking screws threaded into and extending through the upper walls of the rectangular grooves, to thereby press the ends of the two plate-like members downwardly.

The connector of the present invention is placed, for example, between a mold accommodated in a press and a feeder for feeding the plate-like members to the press.

When a substantial length of the preceding member has been processed by the press and the member can no longer be fed by the feeder, the member is further fed simultaneously with the next member via the connector by inserting the trailing end of the preceding member and the leading end of the next member into associated rectangular grooves.

By so doing, the driving force of the feeder acting on the next member can be transmitted to the preceding member via the connector to thereby automatically feed the preceding member until the trailing end thereof reaches a location immediately before the mold.

The connector of the present invention achieves maximized utilization of the plate-like members and enables effective and accurate feed thereof within a short period of time, compared with the conventional case wherein the remaining length of the preceding member is manually fed.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

Figure 1:
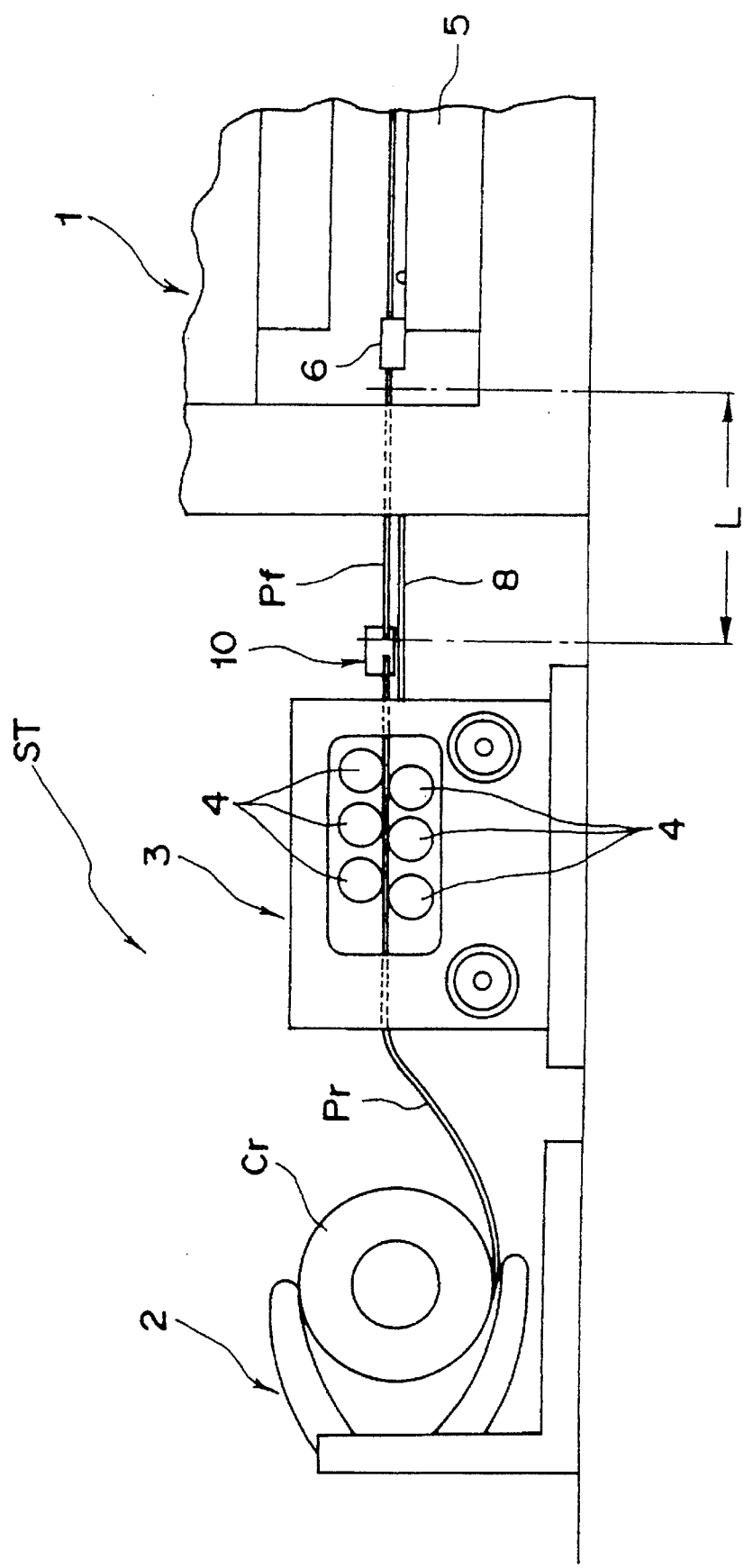
FIG. 1 is a schematic elevational view of a feed station in which the connector of the present invention is placed.
Figure 2:
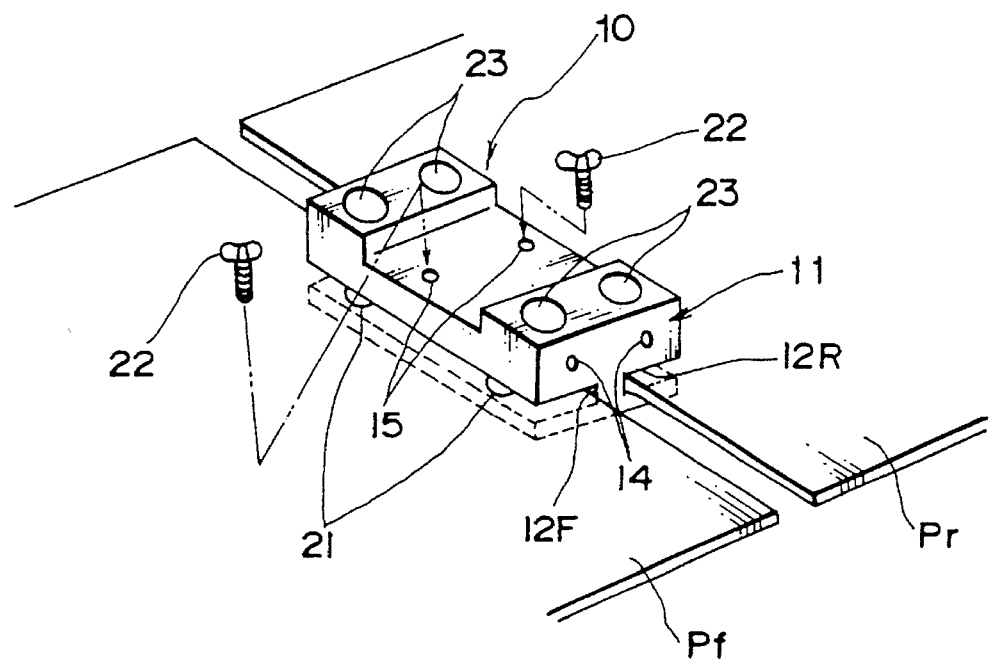
FIG. 2 is a partially exploded perspective view of the connector of the present invention.
Figure 3:
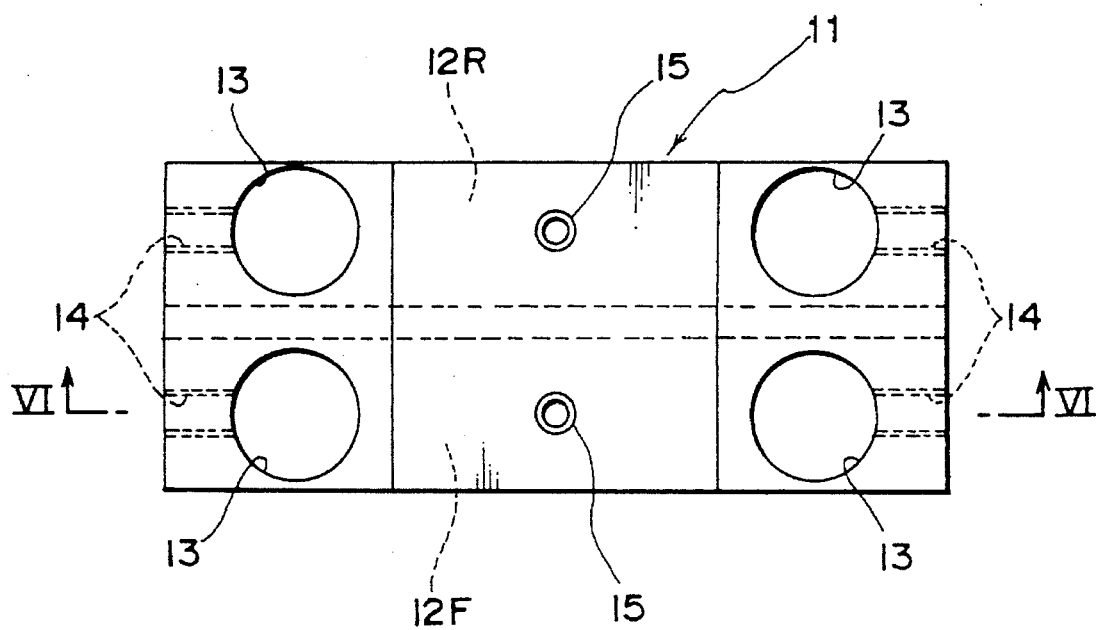
FIG. 3 is a top plan view of a main body of the connector of FIG. 2.
Figure 4:
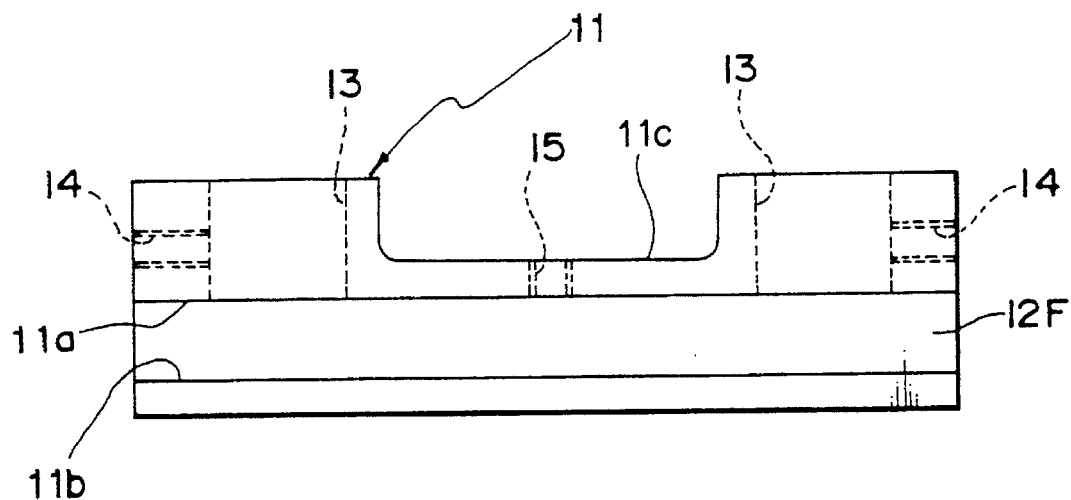
FIG. 4 is a front elevational view of the main body of FIG. 3.
Figure 5:
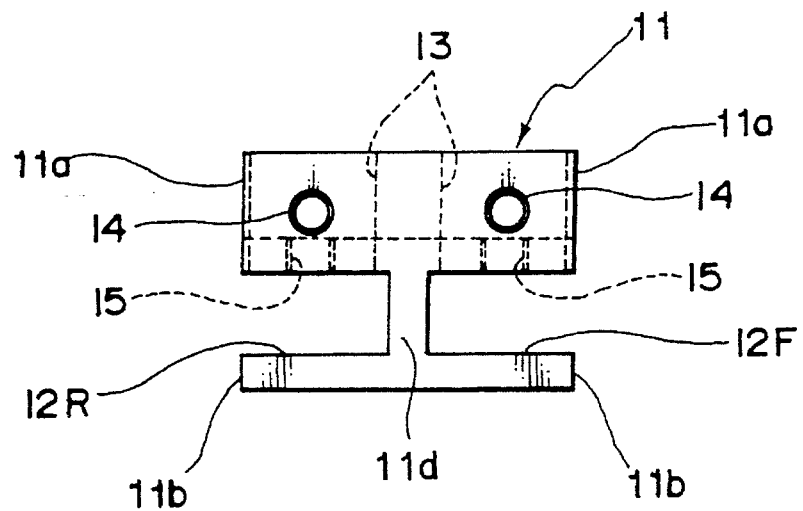
FIG. 5 is a side elevational view of the main body of FIG. 3.
Figure 6:
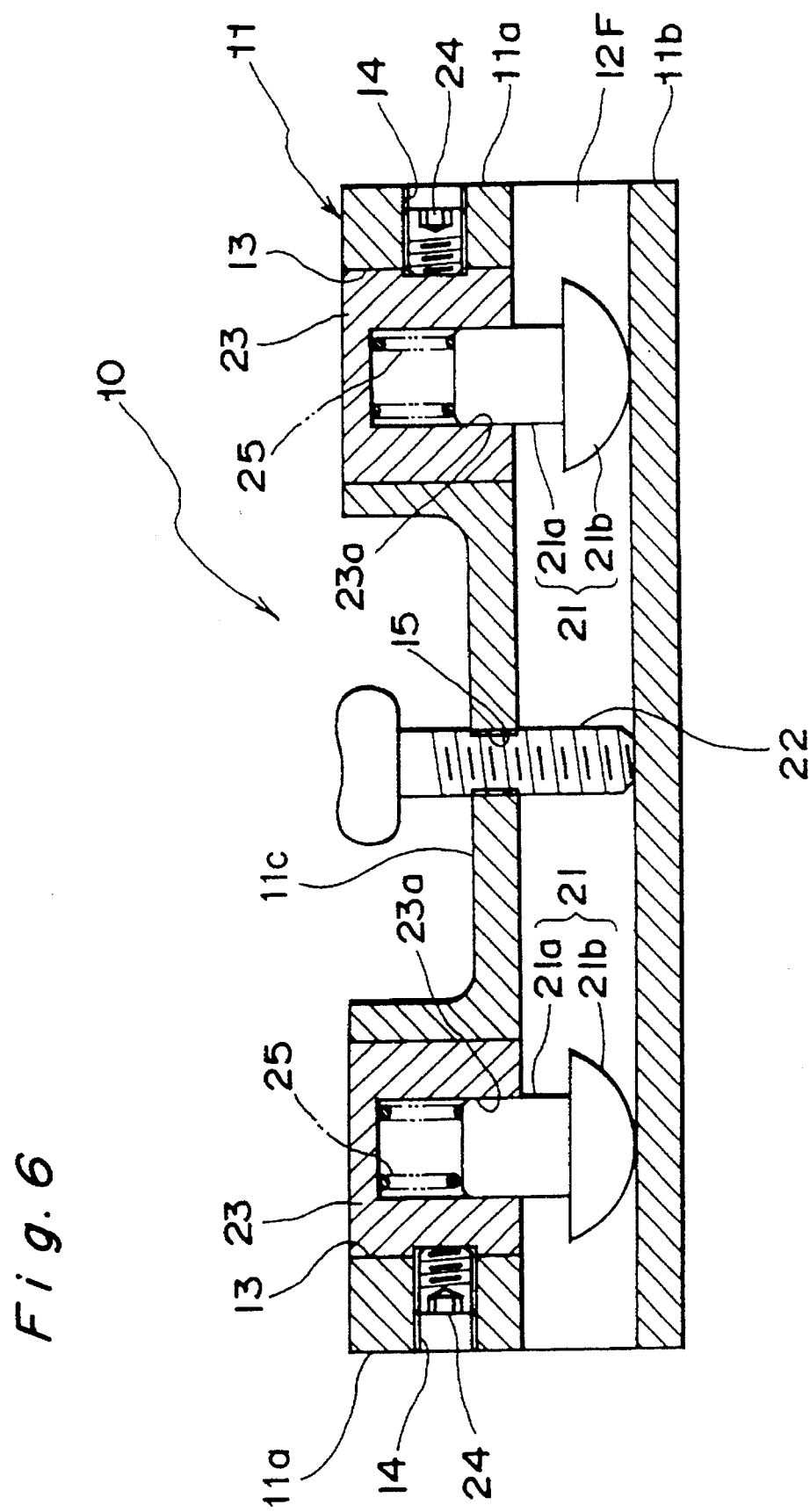
FIG. 6 is a sectional view taken along line VI—VI in FIG. 3 after assembling.

Referring now to the drawings, there is schematically shown in FIG. 1 a feed station ST from which a coiled plate-like member Cr is fed to a press 1. A typical example of the plate-like member is a steel plate or an iron plate. The feed station ST is provided with a carrier 2 for rotatably carrying the coiled member Cr, and a feeder 3 for feeding an uncoiled member Pr to the press 1 while uncoiling the coiled member Cr.

The coiled member Cr is in the form of, for example, a metal strip having a predetermined size (thickness, width, and length) sufficient to be properly fed to the press 1 and is wound around a core rotatably carried by the carrier 2.

The feeder 3 includes a plurality of feed rollers 4 arranged in two rows one above the other to uncoil the coiled member Cr and feed the uncoiled member Pr to the press 1 while sandwiching the uncoiled member Pr between the upper and lower rows of the feed rollers 4. The vertical position of the feed rollers 4 is chosen such that the member Pr may be substantially horizontally fed to a mold 5 mounted in the press 1.

A plate-like feed base 8 extends between the feeder 3 and the press 1, while a guide member 6 is disposed upstream of the mold 5 with respect to the direction of feed of the member Pr to suppress undesired vertical and lateral deviation of the member Pr being fed towards the press 1.

At the feed station ST, the feeder 3 automatically intermittently feeds a predetermined length of the uncoiled member Pr to the press 1 at a desired timing synchronized with the operating cycle of the press 1.

In FIG. 1, another uncoiled member Pf is illustrated which has passed the feeder 3 and, hence, cannot be further fed thereby. The trailing end of this member Pf is connected to the leading end of the next member Pr at a location between the feeder 3 and the press 1, i.e., above the feed base 8 by means of a connector 10 according to the present invention so that both of the members Pf and Pr may be automatically simultaneously conveyed by the feeder 3 to allow the remaining length L of the first-fed member Pf to be transported onto the mold 5.

FIGS. 2 to 7 depict the details of the connector 10 of the present invention. As shown therein, the connector 10 has a main body 11 generally in the form of a rectangular parallelepiped having two raised portions 11a formed at respective ends thereof and spaced from each other. The main body 11 also has two horizontally extending generally rectangular grooves 12F and 12R defined therein by respective lower walls 11b and upper walls 11c so as to open on opposite sides of the main body 11. As shown particularly in FIGS. 2, 5 and 7, main body 11 also has a center wall 11d continuous with walls 11b and 11c and separating grooves 12F and 12R from each other. The rectangular groove 12F is intended to receive the trailing end of the member Pf therein, while the rectangular groove 12R is intended to receive the leading end of the next member Pr therein. The connector 10 includes first and second retaining means 21 and 22 mounted on the main body 11 to retain the two members Pf and Pr within associated rectangular grooves 12F and 12R. The first retaining means 21 comprises two spaced vertically movable pressure members employed for each rectangular groove 12F or 12R and operable to press downwardly the end of the member Pf or Pr inserted in the rectangular groove 12F or 12R by means of associated springs, while the second retaining means 22 comprises a locking screw used for each rectangular groove 12F or 12R and operable to lock the end of the member Pf or Pr.

As specifically shown in FIGS. 3 to 6, the main body 11 has four round holes 13 defined therein, two of which extend vertically through one of the raised portions 11a and the other two of which likewise extend vertically through the other of the raised portions 11a.

A pressure member holder 23 having a height substantially equal to the thickness of the raised portions 11a is received within each round hole 13 and held in position by a set screw 24 threaded into an internally threaded hole 14 that is defined in one of the raised portions 11a so as to extend horizontally in a direction longitudinally of the main body 11. The set screw 24 prevents rotation of the pressure member holder 23 and an accidental separation thereof from the main body 11.

The locking screws 22 are threaded into associated internally threaded holes 15 that extend vertically through upper walls 11c of the rectangular grooves 12F and 12R. The internally threaded holes 15 are positioned at the center of the main body 11 with respect to the longitudinal direction thereof.

Each of the pressure member holders 23 has a vertically extending columnar cavity 23a defined therein. Each of the pressure members 21 has a shank 21a received in the cavity 23a of the associated pressure member holder 23. A compression spring 25 is housed within the cavity 23a so as to apply a biasing force to the shank 21a of the pressure member 21. When no member is received in the rectangular grooves 12F and 12R, respective head portions 21b of the pressure members 21 are held in contact with lower walls 11b defining the grooves under a predetermined pressure, thus avoiding undesired vibrations or looseness thereof.

The biasing forces of the compression springs 25 are so chosen that the ends of the members Pf and Pr can be readily manually inserted deep into the rectangular grooves 12F and 12R, respectively, while raising the head portions 21b of the pressure members 21 against such biasing forces.

Furthermore, the head portion 21b of each pressure member 21 has a lower spherical or round surface that constitutes a lead-in portion facilitating insertion of the end of the member Pf or Pr between the lower end of the head portion 21b and the lower wall 11b of the rectangular groove 12F or 12R.

The connector 10 of the above-described construction operates as follows.

When the preceding member Pf is fed towards the press 1 with the trailing end thereof having passed the feed rollers 4 of the feeder 3, the connector 10 of the present invention is placed on the feed base 8 bridging the press 1 and the feeder 3. The locking screws 22 are then loosened.

Figure 7:
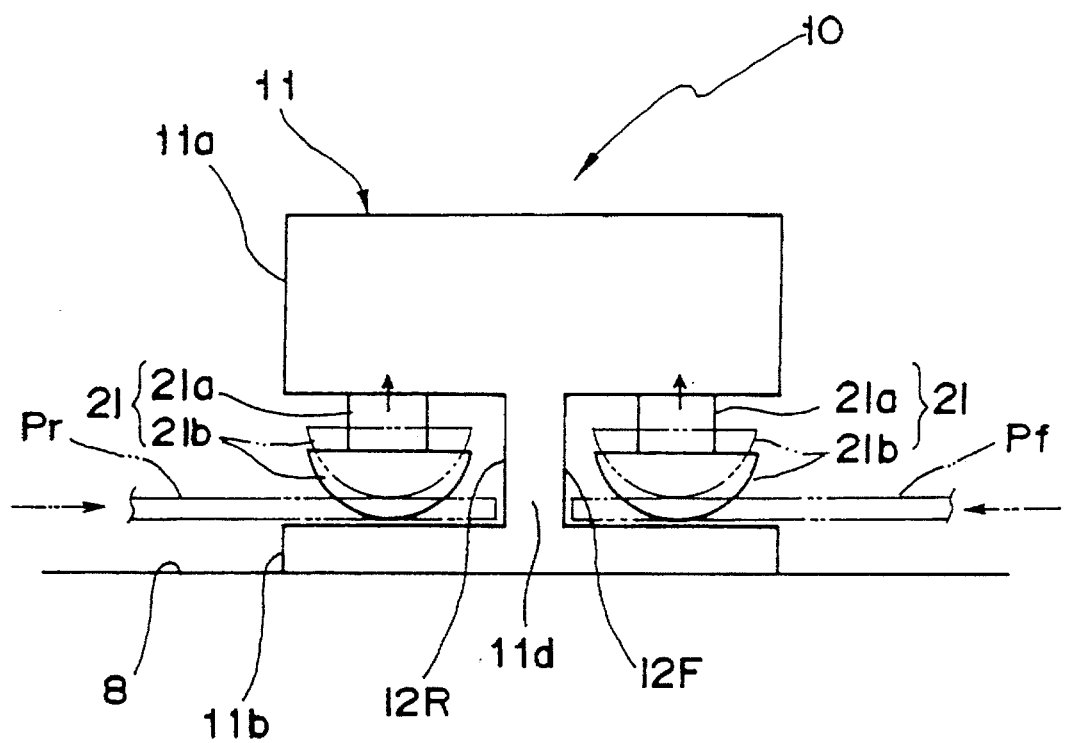
FIG. 7 is a side elevational view of the connector, particularly indicating the operation of pressure members vertically movably disposed therein.

Thereafter, as shown in FIG. 7, the trailing end of the preceding member Pf is slightly lifted up and, in this condition, the connector 10 is fitted to the preceding member Pf with the trailing end thereof inserted into the rectangular groove 12F. After insertion of the trailing end of the member Pf deep into the rectangular groove 12F, the next member Pr is fed by the feeder 3 until the leading end thereof is guided into the rectangular groove 12R.

It is to be noted that the sequence of insertion of the members 12F and 12R into associated rectangular grooves 12F and 12R is not limited by the sequence referred to above, but may be reversed so long as the members Pf and Pr are satisfactorily received in the rectangular grooves 12F and 12R, respectively.

Because the head portions 21b of the pressure members 21 have the semi-spherical surfaces or lead-in portions, the ends of the members Pf and Pr can be manually readily inserted between the lower ends of the head portions 21b and the lower walls 11b of the rectangular grooves 12F and 12R.

At this moment, the pressure members 21 are lifted up by a distance corresponding to the thickness of the members Pf and Pr to compress the associated compression springs 25, which then act to press the trailing end of the member Pf and the leading end of the member Pr downwardly against the lower wall 11b of the rectangular groove 12F and that of the rectangular groove 12R, respectively. By so doing, an accidental separation of the members Pf and Pr from the associated rectangular grooves 12F and 12R is effectively prevented, and the trailing end of the member Pf and the leading end of the member Pr are securely held in the rectangular grooves 12F and 12R, respectively. In other words, adjoining ends of the two plate-like members Pf and Pr can be relatively easily and reliably connected to each other through the connector 10 of the present invention.

Because the pressure members 21 are all biased downwardly by the associated compression springs 25, mere insertion of the members Pf and Pr deep into the rectangular grooves 12F and 12R, respectively, is sufficient to allow the members Pf and Pr to be retained within the rectangular grooves 12F and 12R with no need to use any special retaining means.

It is to be noted that the compression springs 25 employed as the biasing means may be replaced by any other suitable members such as, for example, highly flexible elements made of a soft resin, a soft rubber or the like.

Upon completion of the inserting operation of the members Pf and Pr respectively into the rectangular grooves 12F and 12R, tightening of the locking screws 22 is preferred to more reliably retain the members 12Pf and Pr within the respective grooves 12F and 12R. Tightening of the screws increases the biasing force necessary to urge the members Pf and Pr against the lower walls 11b of the rectangular grooves 12F and 12R, respectively.

As described above, the connector 10 of the present invention has two rectangular grooves 12F and 12R defined in the main body 11, and the retaining means in the form of the plurality of pressure members 21 mounted on the main body 11 for retaining the plate-like members Pf and Pr within the rectangular grooves 12F and 12R, respectively. The connector 10 also has an additional retaining means in the form of the plurality of locking screws 22 threaded into and extending through the upper walls 11c of the rectangular grooves 12F and 12R for locking the members Pf and Pr within the rectangular grooves 12F and 12R, respectively. Accordingly, the two members Pf and Pr can be relatively easily and securely connected to each other through the connector 10, merely by inserting the end portions of the members Pf and Pr into the rectangular grooves 12F and 12R, respectively.

More specifically, when the preceding member Pf has been fed through the feeder 3 with the trailing end thereof leaving the feed rollers 4 of the feeder 3, the connector 10 is first placed between the feeder 3 and the mold 5 accommodated in the press 1 and between the member Pf and the next member Pr then fed by the feeder 3. The two members Pf and Pr are subsequently connected to each other by inserting the trailing end of the member Pf a given length into the rectangular groove 12F, and by likewise inserting the leading end of the member Pr a given length into the rectangular groove 12R.

By so doing, the feeding power of the feeder 3 acting on the next member Pr is transmitted to the preceding member Pf so that the trailing end of the member Pf, which would otherwise be discarded, can be automatically fed by a predetermined distance L until the trailing edge thereof reaches a location immediately behind the mold 5 of the press 1, to accomplish maximized utilization of the member Pf. Compared with the conventional practice in which the trailing end of the preceding member Pf is manually fed to the press 1, the connector 10 makes it possible to accomplish an accurate and quick incremental feed of the member with high efficiency.

It is to be noted here that the connector 10 of the present invention is not limited by the above-described embodiment, but may be changed appropriately. By way of example, although in the above-described embodiment the connector has been shown as including two types of the retaining means, i.e., the pressure members 21 and the locking screws 22, for retaining the two members Pf and Pr within the rectangular grooves 12F and 12R, respectively, one of them may be dispensed with. If two plate-like members can be connected to each other with a relatively small force, the locking screws 22 can be eliminated.

Furthermore, because the feeding power exerted on the members Pf and Pr does not act in a direction in which the members Pr and Pr are separated respectively from the rectangular grooves 12F and 12R, the retaining means 21 and 22 may be provided only for one of the two rectangular grooves 12F and 12R.

Although in the above-described embodiment the plate member which is to be fed to the feeder 3 has been described as a coiled member Cr, the connector 10 of the present invention is effectively applicable to the case where relatively long and flat members are desired to be connected with each other.

In general, plate-like members in the form of a coil have a thickness in the range of 0.4 mm to 3.2 mm and a width in the range of 30 mm to 700 mm. The connector 10 of the present invention can be used to connect two plate-like members of the size referred to above without difficulty. Also, the connector 10 of the present invention can be used to connect two generally flat plate-like members of a size somewhat greater than the size referred to above.

Moreover, members to be connected by the connector 10 of the present invention are not limited to steel plates or iron plates, but may be of other materials. Also, the connector 10 of the present invention is not limited to the case where members to be processed are fed to the press 1, but is effectively applicable to other various cases where connection of two plate-like members is desired.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A connector for connecting two plate-like members, said connector comprising:

a main body having two rectangular grooves defined therein, said two rectangular grooves having respective upper and lower walls and being open on opposite sides of said main body for receiving therein ends of two respective plate-like members, said main body also having a center wall continuous with said upper and lower walls and separating said two rectangular grooves from each other; and retaining means mounted on said main body for retaining the end of at least one of the two plate-like members within a respective one of said rectangular grooves for subsequent simultaneous feed of the two plate-like members.

2. The connector according to claim 1, wherein said retaining means is operable to press the end of the at least one plate-like member downwardly.

3. The connector according to claim 2, wherein said retaining means comprises at least one threaded member threaded into said upper wall of one of said rectangular grooves so as to extend therethrough, to thereby press the end of the at least one plate-like member against said lower wall of said one rectangular groove.

4. The connector according to claim 2, wherein said retaining means comprises a plurality of pressure members pressed downwardly by respective biasing means.

5. The connector according to claim 4, wherein said plurality of pressure members have respective lead-in portions that facilitate insertion of the end of the at least one plate-like member between lower ends of said plurality of pressure members and said lower wall of said one rectangular groove.

6. The connector according to claim 5, wherein said plurality of pressure members are pressed toward said lower wall of said one rectangular groove by a biasing force of said biasing means, said biasing force being so chosen as to allow the end of the at least one plate-like member to be manually inserted between said lower ends of said plurality of pressure members and said lower wall of said one rectangular groove.

7. A connector for connecting two plate-like members, said connector comprising:

a main body having two rectangular grooves defined therein, said two rectangular grooves having respective upper and lower walls and being open on opposite sides of said main body for receiving therein ends of respective two plate-like members, said main body also having a center wall continuous with said upper and lower walls and separating said two rectangular grooves from each other; and first retaining means, mounted on said main body, for retaining the ends of the two plate-like members within respective said rectangular grooves for subsequent simultaneous feed of the two plate-like members.

8. The connector according to claim 7, wherein said first retaining means comprises a plurality of pressure members vertically movably disposed in said main body and a plurality of compression springs for biasing respective pressure members downwardly.

9. The connector according to claim 7, and further comprising second retaining means, mounted on the main body, for retaining the ends of said two plate-like members within said respective rectangular grooves for subsequent simultaneous feed of the two plate-like members.

10. The connector according to claim 9, wherein said second retaining means comprises a plurality of locking screws threaded into and extending through said upper walls of said rectangular grooves, to thereby press the ends of the two plate-like members downwardly.

11. A connector for connecting two plate-like members, said connector comprising:

a main body having two rectangular grooves defined therein, said two rectangular grooves having respective upper and lower walls and being open on opposite sides of said main body for receiving therein ends of two respective plate-like members; and retaining means mounted on said main body for pressing downwardly and retaining the end of at least one of the two plate-like members within a respective one of said rectangular grooves for subsequent simultaneous feed of the two plate-like members, said retaining means comprising a plurality of pressure members pressed downwardly by respective biasing means.

12. The connector according to claim 11, wherein said retaining means further comprises at least one threaded member threaded into said upper wall of one of said rectangular grooves so as to extend therethrough, to thereby press the end of the at least one plate-like member against said lower wall of said one rectangular groove.

13. The connector according to claim 11, wherein said plurality of pressure members have respective lead-in portions that facilitate insertion of the end of the at least one plate-like member between lower ends of said plurality of pressure members and said lower wall of said one rectangular groove.

14. The connector according to claim 13, wherein said plurality of pressure members are pressed toward said lower wall of said one rectangular groove by a biasing force of said biasing means, said biasing force being so chosen as to allow the end of the at least one plate-like member to be manually inserted between said lower ends of said plurality of pressure members and said lower wall of said one rectangular groove.

15. A connector for connecting two plate-like members, said connector comprising:

a main body having two rectangular grooves defined therein, said two rectangular grooves having respective upper and lower walls and being open on opposite sides of said main body for receiving therein ends of two respective plate-like members; and first retaining means, mounted on said main body, for retaining the ends of the two plate-like members within respective said rectangular grooves for subsequent simultaneous feed of the two plate-like members, said first retaining means comprising a plurality of pressure members vertically movably disposed in said main body and a plurality of compression springs for biasing respective said pressure members downwardly.

16. The connector according to claim 15, further comprising second retaining means, mounted on said main body, for retaining the ends of the two plate-like members within respective rectangular grooves for subsequent simultaneous feed of the two plate-like members.

17. The connector according to claim 16, wherein said second retaining means comprises a plurality of locking screws threaded into and extending through said upper walls of said rectangular grooves, to thereby press the ends of the two plate-like members downwardly.

18. A connector for connecting two plate like members, said connector comprising:

a main body having two rectangular grooves defined therein, said two rectangular grooves having respective upper and lower walls and being open on opposite sides of said main body for receiving therein ends of two respective plate-like members; and first retaining means and second retaining means, mounted on said main body, for retaining the ends of the two plate-like members within respective said rectangular grooves for subsequent simultaneous feed of the two plate-like members.

19. The connector according to claim 18, wherein said second retaining means comprises a plurality of locking screws threaded into and extending through said upper walls of said rectangular grooves, to thereby press the ends of the two plate-like members downwardly.

* * * * *